3,234,281
MANUFACTURE OF N,N-DI-SEC-ALKYL
TERTIARY AMINES
Alexander Gaydasch, Chicago, and Joseph T. Arrigo, Mount Prospect, Ill., assignors to Universal Oil Products Company, Des Plaines, Ill., a corporation of Delaware
No Drawing. Filed Jan. 10, 1963, Ser. No. 250,482
15 Claims. (Cl. 260—577)

This invention relates to the manufacture of N,N-di-sec-alkyl tertiary amines and more particularly to an improved method for obtaining increased yields of the desired products.

The preparation of N-sec-alkyl tertiary amines by the reductive alkylation of an amine with a ketone is well-known in the art. The inherent production of N,N-di-sec-alkyl tertiary amines in the reductive alkylation generally occurs to only a minor extent and heretofore was an undesired product. When it was desired to form N,N-di-n-alkyl tertiary amines, this was accomplished by the reductive alkylation of the amine with an aldehyde to form the N,N-di-n-alkyl tertiary amine. In an attempt to prepare N,N-di-sec-alkyl tertiary amines, difficulty was encountered apparently due to steric hindrance. Monoalkylation is the preferential reaction and, once it occurs, it apparently hinders the substitution of another sec-alkyl group for the last hydrogen on the same nitrogen atom. This problem is even further complicated, for example, when an aromatic amine contains a substituent in the ortho position.

From the above discussion, it is seen that the preparation of N,N-di-sec-alkyl-arylamines in high yields is generally difficult to accomplish. In an investigation made by the present applicants, it was found that the yields of such N,N-di-sec-alkyl tertiary amines are very low when an attempt is made to prepare them by the conventional method or reductive alkylation of the amine with a ketone. As a result of this investigation, applicants have found that increased yields of the desired N,N-di-sec-alkyl tertiary amines are obtained when the reductive alkylation is effected in the novel manner herein set forth.

In one embodiment the present invention relates to a process for the preparation of an N,N-di-sec-alkyl tertiary amine which comprises reacting an amine with a ketal at reductive alkylation conditions in the presence of hydrogen and a reductive alkylation catalyst.

In a specific embodiment the present invention relates to a process for the preparation of N,N-diisopropylaniline which comprises reacting aniline with 2,2-dimethoxypropane at reductive alkylation conditions in the presence of hydrogen and a reductive alkylation catalyst.

From the hereinbefore embodiments, it will be seen that the reductive alkylation of the amine is effected using a ketal. Any suitable ketal is used and may be illustrated by the following formula:

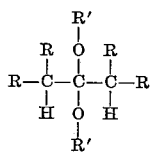

where R is selected from the group consisting of hydrogen and alkyl groups, and R' is an alkyl group.

The particular ketal to be used in the reductive alkylation will depend upon the sec-alkyl group desired in the product. For example, when an N,N-diisopropylamine is desired, a preferred ketal is 2,2-dimethoxypropane. Other ketals include 2,2 - diethoxypropane and 2,2 - dipropoxypropane. Similarly, when the desired alkyl substituent is sec-butyl, a preferred ketal is 2,2 - dimethoxybutane. Other ketals include 2,2-diethoxy butane, 2,2-dipropoxybutane, and 2,2-dibutoxybutane. Illustrative examples of other ketals include 2,2-dimethoxypentane, 3,3-dimethoxypentane, 2,2-dimethoxyhexane, 3,3-dimethoxyhexane, 2,2-dimethoxyheptane, 3,3-dimethoxyheptane, 4,4-dimethoxyheptane, 2,2-dimethoxyoctane, 3,3-dimethoxyoctane, 4,4-dimethoxyoctane, 2,2 - dimethoxynonane, 3,3-dimethoxynonane, 4,4-dimethoxynonane, 5,5-dimethoxynonane, 2,2-dimethoxydecane, 3,3 - dimethoxydecane, 4,4-dimethoxydecane, 5,5-dimethoxydecane. Generally the dimethoxy ketals are preferred, with the diethoxy ketals being next in preference. While the alkoxy group may contain a higher number of carbon atoms per group, which may range up to 6 or more carbon atoms each, generally there is no advantage for the use of the higher molecular weight ketals. However, it is understood that the higher molecular weight ketals may be used in the present invention when desired, but not necessarily with equivalent results.

Referring to the formula of the ketal hereinbefore set forth, in a preferred embodiment at least one of the R radicals attached to each carbon atom is hydrogen and the other R is hydrogen or an alkyl group corresponding to the specific alkyl substituent desired in the final product. R' preferably is an alkyl group of from 1 to 4 carbon atoms and still more preferably of from 1 to 2 carbon atoms.

In one embodiment the ketal is used as the sole alkylating agent. In another embodiment the ketal is used in admixture with a ketone. In the latter embodiment the ketal is employed in a mole ratio to ketone of from about 0.25 to about 3:1. In a preferred embodiment where both sec-alkyl groups are the same, the ketone corresponds to the ketal. Thus, for example, when the ketal is 2,2-dimethoxypropane, the ketone is acetone. Similarly, when the ketal is 2,2-dimethoxybutane, the ketone is methyl ethyl ketone. Illustrative examples of other ketones include methyl propyl ketone, methyl butyl ketone, methyl pentyl ketone, methyl hexyl ketone, methyl heptyl ketone, methyl octyl ketone, methyl nonyl ketone, diethyl ketone, ethyl propyl ketone, ethyl butyl ketone, ethyl pentyl ketone, ethyl hexyl ketone, ethyl heptyl ketone, etc., dipropyl ketone, propyl butyl ketone, propyl pentyl ketone, propyl hexyl ketone, dibutyl ketone, butyl pentyl ketone, butyl hexyl ketone, dipentyl ketone, pentyl hexyl ketone. While it is preferred to use the ketone corresponding to the ketal as hereinbefore set forth, in another embodiment of the invention where the sec-alkyl groups are different, a mixture of ketals or a mixture of ketal and ketone which does not correspond to the ketal may be used. In this embodiment of the invention the product probably comprises a mixture of two different N,N-bis-di-sec-alkylamines and a N,N-di-sec-alkylamine in which the sec-alkyl groups are different.

As hereinbefore set forth, the ketal is used in the reductive alkylation of an amine. Any suitable amine is used. In one embodiment, the present invention is particularly applicable to the reductive alkylation of aromatic amino compounds including aniline, phenylenediamine, phenylenetriamine, aminophenol, similarly substituted naphthalenes, anthracenes. Other aromatic amines include monoamino- and diaminodiphenyl derivatives of alkane, amine, oxygen, sulfur. Illustrative aminodiphenyl compounds include aminodiphenylmethane, diaminodiphenylmethane, aminodiphenylethane, diaminodiphenylethane, aminodiphenylpropane, diaminodiphenylpropane, aminodiphenylbutane, diaminodiphenylbutane, etc., aminodiphenylamine, diaminodiphenylamine, aminodiphenyl ether, diaminodiphenyl ether, aminodiphenyl sulfide, diaminodiphenyl sulfide. When the aromatic amine contains two amino substituents, they preferably are in the para positions, although they may be in the ortho or meta positions, or a mixture of these. Accordingly, preferred phenylenediamines comprise p-phenylenediamines and preferred diaminodiphenyl derivatives comprise p,p-diaminodiphenyl derivatives. In still another embodiment the diaminodiphenyl derivatives contain the amino groups in the o,p' (2,4') positions. The aromatic amines may contain other substituents attached to the ring or rings, which substituents may be selected from alkyl, alkoxy, hydroxy, nitro and halogen including chlorine, iodine, bromine or fluorine. As hereinbefore set forth, both the type of substituent on the ring and the position in relation to the nitrogen atom are important in the manner in which the reductive alkylation is to be effected, as will be described hereinafter in detail.

In another embodiment of the inveniton, the amine is an aliphatic amine and may contain one or more amino groups. Illustrative aliphatic amines include methylamine, ethylamine, propylamine, butylamine, pentylamine, hexylamine, heptylamine, octylamine, ethylenediamine, propylenediamine, butylenediamine, pentylenediamine, hexylenediamine, etc., diethylenetriamine, dipropylenetriamine, dibutylenetriamine, triethylenetetramine, tripropylenetetramine, tetraethylenepentamine, tetrapropylenepentamine, as well as alkanolamines including ethanolamine, propanolamine, butanolamine, pentanolamine, hexanolamine, heptanolamine, octanolamine. In still another embodiment of the nitrogen-containing compound is ammonia which is reductively alkylated to form di-sec-alkylamine.

In another but not necessarily equivalent embodiment of the invention, the charge to reductive alkylation may comprise a precursor compound which, under the reductive alkylation conditions herein set forth, undergoes reductive alkylation with a ketal. Illustrative compounds in this embodiment include (1) nitro compounds including nitro- or polynitrobenzenes, nitro- or polynitronaphthalenes, nitrophenol, nitro- or polynitrodiphenyl compounds, nitro- or polynitroalkanes, (2) nitroso compounds including nitrosobenzene, nitrosophenol, tertnitrosoisobutane, tertnitrosoisopentane, 1-chloro-1-nitrosoethane, (3) azo compounds including azobenzene, various azo dyes, (4) hydrazo compounds including hydrazobenzene, hydrazonaphthalene, and (5) hydroxylammonium compounds including hydroxylamine, phenylhydroxylamine, acetaldoxime, acetoxime.

In still another embodiment, the present invention is used to introduce a sec-alkyl group on a nitrogen atom already containing a hydrocarbon substituent, which hydrocarbon substituent may be the same as or different from the sec-alkyl group. For example, N-n-alkyl or N-sec-alkylaniline is reductively alkylated with a ketal to form N-n-alkyl-N-sec-alkylaniline or N,N-di-sec-alkylaniline. Similarly, N,N'-dialkyl-phenylenediamines are reductively alkylated to form the N,N,N'-trialkylated or N,N,N',N'-tetralkylated phenylenediamines in which the added alkyl group or groups are of sec-alkyl configuration. Also diphenylamine, dicyclohexylamine or phenylcyclohexylamine are reductively alkylated to form N-sec-alkyldiphenylamine, N-sec-alkyldicyclohexylamine or N-sec-alkylphenylcyclohexylamine, respectively.

The reductive alkylation of the amine is effected in any suitable manner and, as hereinbefore set forth, the particular method will depend upon whether the aromatic amine, for example, contains a substituent in the ortho position and upon the particular radical in this position. When the amine is free from a substituent in the position ortho to a nitrogen atom, or when the substituent in this position is an alkoxy and particularly a methoxy radical, or when the substituent is in the meta and/or para positions, the reductive alkylation is effected at a temperature above 200° F. and more particularly at a temperature within the range of from about 250° to about 350° F., although a higher temperature up to about 500° F. may be used. The temperature will be selected with reference to the particular amine and ketal being subjected to reaction. The reductive alkylation is effected in the presence of hydrogen which may comprise a hydrogen pressure of from about 100 to 3000 pounds or more per square inch. In this embodiment of the invention, the catalyst preferably is a platinum-containing catalyst.

When the aromatic amine, for example, contains an alkyl substituent or a halogen in the position ortho to a nitrogen atom, the reductive alkylation preferably is effected at a lower temperature which may range from about ambient (75° F.) to about 200° F. and preferably from 75° to about 125° F. In this embodiment the catalyst preferably is a palladium-containing catalyst, and the reaction is effected in an acidic medium as will be described hereinafter in detail. Here again, the reaction is effected in a hydrogen atmosphere of from about 100 to 3000 pounds or more per square inch.

In one embodiment of the invention the ketal is used as the sole alkylating agent and is used in a mole proportion to amine of at least 2:1. When a mixture of ketal and ketone is used as the alkylating agent, the mixture is used in a mole proportion to amine of at least 2:1. However, in order to insure complete reaction, it is preferred to use the ketal or the ketal-ketone mixture in a mole proportion to amine of at least 3:1 and thus may range from 3:1 to 10:1 or more.

Any suitable reductive alkylation catalyst is used and, as hereinbefore set forth, will depend upon the temperature and other details of the reductive alkylation system. Examples of reductive alkylation catalysts include those containing platinum, palladium, ruthenium, nickel, copper, molybdenum, as, for example, platinum-alumina, platinum-silica, platinum-silica-alumina, platinum-carbon, palladium-alumina, palladium-silica, palladium-silica-alumina, palladium-carbon, ruthenium-carbon, ruthenium-alumina, ruthenium-silica, nickel-alumina, nickel-silica, nickel-silica-alumina, as well as the corresponding sulfided catalysts. It is understood that the platinum and/or palladium may be present as the free metal, oxide and/or sulfide. For use at the higher temperature as hereinbefore set forth, a preferred catalyst comprises a platinum-containing catalyst and particularly a composite of from about 0.1% to about 20% and more particularly from about 0.3% to about 5% by weight of platinum composited with alumina. For use at the lower temperature at hereinbefore set forth, a preferred catalyst comprises a palladium-containing catalyst and particularly from about 0.1% to about 30% and more particularly from about 1% to about 15% by weight of palladium composited with carbon or alumina. When desired, the platinum or palladium catalyst also may contain halogen and particularly chlorine and/or fluorine in a total concentration of from about 0.2 to about 10% or more by weight of the final catalyst.

In another embodiment of the invention, the reductive alkylation is effected in the presence of an acidic medium. Even further improved yields are obtained when the reductive alkylation is effected in the presence of acidic medium including, for example, acetic acid and alkanesulfonic acid. A preferred alkanesulfonic acid is a commercial alkanesulfonic acid mixture having an equivalent weight of 113 which corresponds to an average of about 2 carbon atoms per alkane group. Other alkanesulfonic acids include methanesulfonic acid, ethanesulfonic acid, propane sulfonic acid, butanesulfonic acid, pentanesulfonic acid, hexanesulfonic acid. Aromatic sulfonic acids include benzenesulfonic acid, toluenesulfonic acid, and mixtures thereof. Other organic acids include formic acid, propionic acid, butyric acid, dicarboxylic acids, polycarboxylic acids. Other acidic media comprise hydrochloric acid, phosphoric acid, sulfuric acid, hydrogen sulfide. The amount of acidic medium to be used will depend upon the particular acidic medium and may range from 0.01 to 20 moles per mole of amine and, in one embodiment of the invention, when using the platinum-containing catalyst at the higher temperature, as hereinbefore set forth, preferably will be in the range of from about 0.1 to about 1 mole of acid per mole of amine.

When the reductive alkylation is effected in the presence of a palladium catalyst at the lower temperature as hereinbefore set forth, the reaction preferably is effected in the presence of both an organic acid and a mineral acid. A preferred organic acid is glacial acetic acid and the preferred mineral acid is concentrated sulfuric acid. The acetic acid generally is used in a large concentration which may range from 0.5 to 20 moles per mole of amine and the sulfuric acid generally is used in small concentrations which may range from about 0.01 to 0.5 mole per mole of amine.

The reductive alkylation is effected in either a batch or continuous type of operation. In a batch type of operation the reactants, catalysts, hydrogen and acidic medium, when employed, are charged to a sealed reactor and heated and maintained at the desired temperature for a time sufficient to complete the reaction. The time may range from 0.5 to 48 hours or more. The sealed reactor preferably is designed to provide intimate mixing of the reaction mixture and may contain mixing blades, recirculating means, or it may comprise a rotating or rocking autoclave. After completion of the reaction, the reaction mixture is filtered to remove catalyst, neutralized with lime, sodium hydroxide, potassium hydroxide, corresponding oxides, carbonates, bicarbonates, or other alkaline reagent to remove acidic components, and then fractionated to separate the N,N-di-sec-alkyl tertiary amine from unreacted components and by-products. The by-products may include the monoalkylated amine which may be subjected to further reaction to prepare the N,N-di-sec-alkylamine. Similarly, unreacted components including hydrogen, excess ketal and/or ketone, if present, may be used for further reaction.

In a continuous type of process, the catalyst preferably is deposited as a fixed bed in a reaction zone and the reactants, at the proper temperature and pressure, are introduced into the reaction zone and contacted with the catalyst in either upward or downward flow. The effluent products from the reaction zone are neutralized in any suitable manner when the reductive alkylation is effected in the presence of an acidic medium, the resultant salt is removed by filtration and/or washing, and then the effluent products are fractionated to separate the desired N,N-di-sec-alkyl tertiary amine from unreacted components and other products. The unreacted components, including hydrogen, ketal and/or ketone, are recycled for further use in the process. Similarly, N-monoalkylated amine also is recycled for further conversion into the desired dialkylated amine. Another type of continuous process comprises the slurry or suspensoid type in which the catalyst is carried into the reaction zone by means of one or more of the reactants.

N,N-dialkylamines are of varied utility, either for use as such or as intermediates in the preparation of quaternary ammonium salts, diazonium compounds used in the dye and in the copy reproduction industry, or as insecticides, fungicides, herbicides, stabilizers or antioxidants in hydrocarbon oils. Certain of the N,N-di-sec-alkyl tertiary amines of the present invention are of improved utility in some of these uses and others may be of advantage for other uses.

The following examples are introduced to illustrate further the novelty and utility of the present invention but not with the intention of unduly limiting the same.

EXAMPLE I

In an attempt to prepare N,N-diisopropylaniline, a series of experiments were made in accordance with the teachings of the prior art. In these experiments, the reductive alkylation was effected using aniline and acetone, hydrogen pressures of 1000 pounds or higher, different temperatures, different mole ratios of acetone to aniline and different types of closed reactors. A preferred catalyst for this reaction is a platinum-containing catalyst and such a catalyst was used in this series of runs. The catalyst comprises approximately 0.3% by weight of platinum composited with alumina. The temperatures ranged from 285° to about 400° F. and the mole ratio of ketone to aniline ranged from 3:1 to 5:1. The different reactors included rocking autoclave, rotating autoclave and turbomixer. In all of these runs the yields of the desired N,N-diisopropylaniline were very low and generally ranged from about 2% to about 14% and, in one case, was as high as 23.2% based on the aniline charged.

Typical data from the best runs in this series are shown in the following table.

Table I

| Run No. | Temperature, °F. | Acetone to Aniline Mole Ratio | Pressure, p.s.i. | Reaction Time, Hours | Reaction Mixture | | Dialkylate based on aniline charged, Percent |
|---|---|---|---|---|---|---|---|
| | | | | | Monoalkylate, Percent | Dialkylate, Percent | |
| 1 | 285 | 5:1 | 1,100 | 12 | 11 | 0.7 | 4.6 |
| 2 | 285 | 5:1 | 1,470 | 16 | 30.4 | 3.4 | 7.85 |
| 3 | 285 | 5:1 | 1,735 | 16 | 29.9 | 4 | 9.3 |
| 4 | 285 | 5:1 | 1,840 | 16 | 30.5 | 6.1 | 13.8 |
| 5 | 320 | 5:1 | 1,700 | 12 | 26.4 | 4.2 | 10.8 |
| 6 | 320 | 5:1 | 1,700 | 12 | 27.7 | 4.2 | 10.35 |
| 7 | 320 | 5:1 | 1,000 | 86 | 8.1 | 3.2 | 23.2 |

From the data in the above table, it will be seen that in most cases the yield of the desired N,N-diisopropylaniline, based on the aniline charged, was below about 14%. In the run conducted for 86 hours, this yield was 23.2% but, it will be noted that the percent of dialkylate, based on the reaction mixture, was only 3.2%.

EXAMPLE II

The data in this example illustrate the improved yields obtained when using dimethoxypropane or a mixture of acetone and dimethoxypropane in the alkylation of aniline. These runs were made in the same manner as described in Example I, except for the use of dimethoxypropane (abbreviated DMP in the following table).

The results of these runs are shown in the following table.

Table II

| Run No. | Temperature, °F. | DMP, Moles | Acetone, Moles | DMP+Acetone to Aniline Mole Ratio | Pressure, p.s.i. | Reaction Time, Hours | Reaction Mixture | | Dialkylate based on aniline charged, Percent |
|---|---|---|---|---|---|---|---|---|---|
| | | | | | | | Monoalkylate, Percent | Dialkylate, Percent | |
| 8 | 285 | 2 | 1 | 3:1 | 1,000 | 21 | 21.5 | 33.1 | 53.4 |
| 9 | 285 | 2 | 2 | 4:1 | 1,000 | 35 | 8.4 | 21.2 | 69.2 |
| 10 | 285 | 4 | | 4:1 | 1,730 | 12 | 11.7 | 17.1 | 52.6 |
| 11 | 320 | 2 | 3 | 5:1 | 1,000 | 86 | 6.2 | 13.8 | 63 |

From the data in the above table, it will be seen that the use of DMP (dimethoxypropane) alone or in admixture with acetone considerably improved the yields of the desired N,N-diisopropylaniline. It will be noted that these improved yields also were obtained in runs 8–10, even with the lower ratio of DMP or DMP+acetone to aniline than the 5:1 mole ratio of acetone to aniline used in the runs reported in Table I.

EXAMPLE III

As another approach to the preparation of N,N-diisopropylaniline, it was thought that the monoalkylate (N-isopropylaniline) could be further reductively alkylated with acetone to form the desired dialkylated product.

Another series of runs were made in substantially the same manner as described in Example I, except that the reaction mixture consisted of acetone and N-isopropylaniline instead of aniline. Typical data from these runs are shown in the following table.

*Table III*

| Run No. | Temperature, °F. | Acetone to N-isopropylaniline, Mole Ratio | Pressure, p.s.i. | Reaction Time, Hours | Reaction Mixture | | Dialkylate Based on N-isopropylaniline Charged |
|---|---|---|---|---|---|---|---|
| | | | | | Monoalkylate, Percent | Dialkylate, Percent | |
| 12 | 285 | 2:1 | 2,000 | 12 | 17.9 | 0 | 0 |
| 13 | 285 | 5:1 | 1,790 | 12 | 11.9 | 1.8 | 10.36 |
| 14 | 285 | 5:1 | 2,000 | 16 | 22 | 6.4 | 17.7 |
| 15 | 285 | 5:1 | 1,830 | 16 | 19.1 | 0 | 0 |
| 16 | 320 | 2.3:1 | 1,000 | 16 | 48.4 | 7.1 | 10 |
| 17 | 355 | 2.5:1 | 1,810 | 12 | 31.3 | 7.2 | 14.9 |

From the above data it will be seen that this approach to the problem was not successful because the amounts of dialkylate, either in the reaction mixture or based on the N-isopropylaniline charged, were too low for practical purposes.

EXAMPLE IV

This example reports the results of runs made in the same manner as described in Example III (N-isopropylaniline instead of aniline), but using dimethoxypropane or a mixture of dimethoxypropane and acetone instead of only acetone. Typical data are shown in the following table.

*Table IV*

| Run No. | Temperature, °F. | Acetone, Moles | DMP, Moles | Acetone+DMP to N-isopropylaniline Mole ratio | Pressure, p.s.i. | Reaction Time, Hours | Reaction Mixture | | Dialkylate Based on N-isopropylaniline Charged |
|---|---|---|---|---|---|---|---|---|---|
| | | | | | | | Monoalkylate, Percent | Dialkylate, Percent | |
| 18 | 285 | 1.5 | 1.5 | 3:1 | 1,830 | 12 | 22.06 | 12.6 | 30.2 |
| 19 | 285 | | 2 | 2:1 | 1,970 | 6 | 31.3 | 17.7 | 30.1 |

From the data in the above table, it will be seen that the use of dimethoxypropane, alone or in admixture with acetone, produced yields of the desired N,N-diisopropylaniline of more than double, in most cases, than when using acetone alone.

EXAMPLE V

Because it now has been established that the use of dimethoxypropane produced higher yields of the desired N,N-diisopropylaniline, another independent series of runs were made. These runs were made in a rocking autoclave using an initial hydrogen pressure of 1760 pounds, 16 hours duration and a platinum-alumina catalyst. Typical results of these runs are shown in the following table.

*Table V*

| Run No. | Temperature, °F. | DMP to Aniline Mole Ratio | Reaction Mixture Mole Percent of Aniline Charged | | Molar Ratio Di to Monoalkylate |
|---|---|---|---|---|---|
| | | | Monoalkylate | Dialkylate | |
| 20 | 285 | 4:1 | 38 | 50 | 1.31 |
| 21 | 340 | 4:1 | 27 | 57 | 2.11 |

From the data in the above table, it will be seen that the yields of N,N-diisopropylaniline are substantially greater than the yields of the monoisopropylaniline and that these results are of considerable improvement over those obtained when using only acetone as the alkylating agent.

EXAMPLE VI

The effect of substituents attached to the aniline ring also was investigated. These runs were made in substantially the same manner described in Example V, using dimethoxypropane as the alkylating agent. When the aniline contained a chloro, methyl or methoxy substituent in the ortho position, it was found that the yields of the desired N,N-dialkylated products were low. Therefore, the reductive alkylation of such substituted anilines should be conducted at the lower temperature hereinbefore described in the specifications and as will be illustrated in subsequent examples.

The effect of these substitutions, when positioned in the 3- (or meta-) position on the aniline ring, is not detrimental to the reductive alkylation conducted as set forth in Example V. This is illustrated by the results reported in the following table, in which the reductive alkylation was conducted in substantially the same manner described in Example V, except that the aniline contained a substituent in the 3-position as set forth in the following table.

*Table VI*

| Run No. | Temperature, °F. | Substituent on Aniline Ring | DMP to Aniline Mole Ratio | Reaction Mixture Mole Percent of Aniline Charged | | Molar Ratio Di to Monoalkylate |
|---|---|---|---|---|---|---|
| | | | | Monoalkylate | Dialkylate | |
| 22 | 340 | 3-chloro | 4:1 | 17 | 65 | 3.82 |
| 23 | 340 | 3-methyl | 4:1 | 23 | 58 | 2.52 |
| 24 | 340 | 3-methoxy | 4:1 | 28 | 53 | 1.89 |

From the data in the above table, it will be seen that the yields of the desired N,N-diisopropylated products were comparatively high, being in a molar ratio to the monoalkylate of from about 1.9 to about 3.8.

EXAMPLE VII

As hereinbefore set forth, another embodiment of the invention comprises effecting the reductive alkylation in the presence of an acidic medium. In a particularly preferred embodiment, the acidic medium comprises both acetic acid and sulfuric acid, and the reductive alkylation is effected in the presence of a palladium-containing catalyst at a temperature below about 125° F.

The reductive alkylation of aniline with dimethoxypropane was effected using 2 grams of a 5% by weight of palladium composited with charcoal catalyst, 0.2 mole of aniline, 0.82 mole of dimethoxypropane, 140 ml. glacial acetic acid and 4 ml. of concentrated sulfuric acid. This run was made in a rotating autoclave, charged with a hydrogen pressure of about 1800 pounds, and the run continued for about 5 hours. The results of this run are reported in the following table.

From the data in the above table, it will be seen that substantially complete conversion to the N,N-dialkylated product was obtained.

*Table VII*

| Run No. | Temperature, °F. | DMP to Aniline Mole Ratio | Reaction Mixture Mole Percent of Aniline Charged | |
|---|---|---|---|---|
| | | | Monoalkylate | Dialkylate |
| 25 | 85 | 4:1 | | 56 |

EXAMPLE VIII

As hereinbefore set forth, when the reductive alkylation of 2-methylaniline with dimethoxypropane is effected under the higher temperatures described in Example I and using the platinum-containing catalyst, an extremely low yield of the desired N,N-dialkylated product is obtained. However, when using the palladium-containing catalyst, acetic acid and sulfuric acid at a lower temperature, considerably improved yields of the N,N-dialkylated product are obtained. This is demonstrated by the data reported in the following table. This run was made in substantially the same manner described in Example VII.

*Table VIII*

| Run No. | Temperature, °F. | Substituent on Aniline Ring | DMP to Aniline Mole Ratio | Reaction Mixture Mole Percent of Aniline Charged | | Molar Ratio Di to Monoalkylate |
|---|---|---|---|---|---|---|
| | | | | Monoalkylate | Dialkylate | |
| 26 | 122 | 2-methyl | 4:1 | 4 | 79 | 20 |

From the data in the above table, it will be seen that the desired dialkylation is obtained, with the formation of only a minor amount of the monoalkylate.

EXAMPLE IX

N-isopropyl-2-methylaniline and N-isopropyl-2-chloroaniline were subjected to further reductive alkylation using the palladium-carbon catalyst, acetic acid and sulfuric acid in substantially the same manner described in Example VII. The results of these runs are shown in the following table.

*Table IX*

| Run No. | Temperature, °F. | Substituent on Ring | DMP to N-propylaniline, Mole Ratio | Reaction Mixture | | Molar Ratio Di to Monoalkylate |
|---|---|---|---|---|---|---|
| | | | | Monoalkylate, Mole Percent | Dialkylate, Mole Percent | |
| 27 | 122 | 2-methyl | 2.4:1 | | 75 | All di. |
| 28 | 122 | 2-chloro | 2.3:1 | | 91 | Do. |

From the data in the above table, it will be seen that no monoalkylate was recovered in the reaction mixture and that the alkylated product was all converted to the N,N-dialkylated derivative. Some dechlorination occurred in run No. 28. Accordingly, the reductive alkylation of 2-chloro-N-isopropylaniline preferably is effected in the presence of a ruthenium-containing catalyst.

EXAMPLE X

Aniline is reductively alkylated with 2,2-diethoxybutane at a temperature of 300° F. and in the presence of a catalyst comprising a composite of platinum and alumina. The diethoxybutane is used in a mole ratio to aniline of 4:1. The reductive alkylation is effected in a continuous process in which the reactants and hydrogen are passed upwardly through a fixed bed of the catalyst disposed in a reaction zone. The reductive alkylation is effected at a pressure of 1200 pounds per square inch, and the reactor effluent products are supplied to a receiver operated at 25 pounds per square inch. Hydrogen from the receiver is recycled to the reactor for further use therein. The liquid products from the receiver are fractionated to recover N,N-di-sec-butylaniline from the other products. Any N-sec-butylaniline formed in the process is recycled to the reactor for further reaction therein.

EXAMPLE XI p-Phenylenediamine is reductively alkylated with a mixture of equimolar proportions of acetone and 2,2-di-ethoxypropane at a temperature of 280° F. in the presence of acetic acid and a platinum-containing catalyst. A rotating autoclave is charged with 1 mole of phenylenediamine, 6 moles of 2,2-diethoxypropane and 1 mole of acetic acid, and then is pressured with hydrogen to 1500 pounds. The reaction mixture is heated to 280° F. for 12 hours. After the reaction has been completed and the autoclave has cooled, the reactor effluent is filtered to remove catalyst, neutralized with lime, then filtered to remove the resultant salts, and finally fractionated to separate, N,N,N',N' - tetraisopropyl-p-phenylenediamine.

EXAMPLE XII

Aniline is reductively alkylated with 2,2-dimethoxypropane at a temperature of 310° F. in the presence of a platinum-containing catalyst and an alkanesulfonic acid. The alkanesulfonic acid used in this example is a mixture of alkanesulfonic acids available commercially, having an equivalent weight of 113 which corresponds to an average of about 2 carbon atoms per alkane group. The reductive alkylation is effected in substantially the same manner as described in Example XI. Following completion of the reaction, neutralization and filtering to remove solids, the desired N,N-diisopropylaniline is separated by fractionation from the other products of the process.

EXAMPLE XIII 2,4'-diaminodiphenyl ether is subjected to reductive alkylation with a mixture of 2,2-dimethoxypropane and acetone. The dimethoxypropane and acetone are used in equimolar proportions, and the total thereof to diaminodiphenyl ether is in a molar ratio of 8:1. The reductive alkylation is effected at a temperature of 90° F. in the presence of a catalyst comprising 10% palladium composited with charcoal. The reaction is effected in substantially the same manner described in Example VII, using glacial acetic acid and concentrated sulfuric acid in the reaction mixture. The reaction mixture is charged to a rocking autoclave which then is pressured to 1200 pounds with hydrogen. Following completion of the reaction and cooling of the autoclave, excess hydrogen is vented and the reaction mixture is neutralized with aqueous sodium hydroxide. The organic layer is extracted with ether and then the desired N,N,N',N'-tetraisopropyl-2,4'-diaminodiphenyl ether is recovered from the other products of the process.

EXAMPLE XIV 4,4'-diaminodiphenylmethane is subjected to reductive alkylation with 2,2-dimethoxybutane in substantially the same manner as described in Example XIII. N,N,N',N'-tetra-sec-butyl-4,4'-diaminodiphenylmethane is separated from the reaction products and is recovered as the desired product of the process.

EXAMPLE XV

N,N-diisopropyl-p-aminophenol is prepared by the reductive alkylation of p-aminophenol with a mixture of 2,2-dimethoxypropane and acetone in equal mole proportions, the total thereof being employed in a mole ratio of 4:1 to aminophenol. The reductive alkylation is effected in substantially the same manner described in Example XIII and the desired N,N-diisopropyl-p-aminophenol is recovered from the reaction products.

EXAMPLE XVI

N,N-diisopropylethanolamine is prepared by the reductive alkylation of ethanolamine with 2,2-diethoxypropane in substantially the same manner described in Example XIII. After cooling of the autoclave, the desired N,N-diisopropylethanolamine is recovered from the reaction mixture.

EXAMPLE XVII

The reductive alkylation of o-chloroaniline with dimethoxypropane was effected at 122° F. using 2 g. of a 5% by weight of ruthenium composited with charcoal catalyst, 0.2 mole of o-chloroaniline, 0.82 mole of dimethoxypropane, 140 ml. of glacial acetic acid and 4 ml. of concentrated sulfuric acid. This run was made in a rotating autoclave charged with a hydrogen pressure of about 1800 pounds. Following completion of the reaction and cooling of the autoclave, excess hydrogen is vented and the reaction mixture is neutralized with aqueous sodium hydroxide. The organic layer is extracted with ether and the desired 2-chloro-N,N-diisopropylaniline is recovered from the other products of the process.

2-chloro-N,N-diisopropylaniline was recovered in good yield. Only negligible amounts of dechlorination occurred in this run. Accordingly, as mentioned in Example IX, when 2-chloroaniline is used as a reactant, a ruthenium-containing catalyst preferably is employed.

We claim as our invention:

1. In the catalytic reductive alkylation of an amine selected from the group consisting of aromatic and aliphatic amines in the presence of hydrogen, the improvement of reacting the amine with a ketal as alkylating agent to produce, N,N-di-sec-alkyl tertiary amine, said ketal having the formula

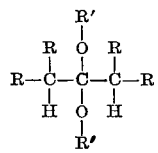

where R is selected from the group consisting of hydrogen and alkyl groups of from 1 to 7 carbon atoms and R' is an alkyl group of from 1 to 4 carbon atoms.

2. The process of claim 1 wherein the alkylating agent is a mixture of a ketal and a ketone.

3. The process of claim 1 wherein said reductive alkylation is effected at a temperature of from about 200° to about 500° F. in the presence of a catalyst whose active component is platinum.

4. The process of claim 1 wherein said reductive alkylation is effected at a temperature of from about 75° to about 200° F. in the presence of a catalyst whose active component is palladium.

5. The process of claim 1 further characterized in that said amine is an N-alkylamine.

6. The process of claim 1 further characterized in that said amine is N-isopropylaniline and said ketal is 2,2- dimethoxypropane whereby to produce N,N-diisopropylaniline.

7. The process of claim 1 further characterized in that said amine is phenylenediamine.

8. The process of claim 1 further characterized in that said amine is diaminodiphenyl ether.

9. The process of claim 1 further characterized in that said amine is diaminodiphenylalkane.

10. The process of claim 1 further characterized in that said amine is an aminophenol.

11. The process of claim 1 further characterized in that said amine is an alkanolamine.

12. The process of claim 1 further characterized in that said amine is aniline and said ketal is 2,2-dimethoxypropane whereby to produce N,N-diisopropylaniline.

13. The process of claim 12 wherein the alkylating agent is a mixture of 2,2-dimethoxypropane and acetone.

14. The process of claim 12 wherein said reductive alkylation is effected in the presence of acetic acid.

15. The process of claim 12 wherein said reductive alkylation is effected at a temperature of from about 200° to about 500° F. in the presence of a catalyst whose active component is platinum.

References Cited by the Examiner

Adams et al.: "Organic Reactions," vol. IV, pages 174–255 (1948).

Lorette et al.: "Jour. Organic Chemistry," vol. 25, No. 4, pages 521–8 (1960).

Wagner et al.: "Synthetic Organic Chemistry," pages 261–7 (1953).

CHARLES B. PARKER, *Primary Examiner.*